US012645135B2

(12) United States Patent
Hao et al.

(10) Patent No.: US 12,645,135 B2
(45) Date of Patent: Jun. 2, 2026

(54) POINT CLOUD PROJECTION SYSTEM

(71) Applicant: SHENZHEN METALENX TECHNOLOGY CO., LTD, Shenzhen (CN)

(72) Inventors: Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 281 days.

(21) Appl. No.: 18/646,769

(22) Filed: Apr. 26, 2024

(65) Prior Publication Data

US 2024/0345463 A1      Oct. 17, 2024

Related U.S. Application Data

(63) Continuation of application No. PCT/CN2022/131627, filed on Nov. 14, 2022.

(30) Foreign Application Priority Data

Nov. 23, 2021    (CN) .......................... 202111397780.4

(51) Int. Cl.
 G03B 21/14        (2006.01)
 G02B 1/00         (2006.01)
 G02B 27/00        (2006.01)
 G03B 21/20        (2006.01)
(52) U.S. Cl.
 CPC ......... *G03B 21/2033* (2013.01); *G02B 1/002* (2013.01); *G02B 27/0012* (2013.01); *G03B*

*21/142* (2013.01); *G03B 21/2013* (2013.01); *G02B 2207/101* (2013.01)

(58) Field of Classification Search
 CPC .............. G03B 21/2033; G03B 21/142; G03B 21/2013; G02B 1/002; G02B 27/0012; G02B 2207/101; G02B 27/18
 See application file for complete search history.

(56) References Cited

U.S. PATENT DOCUMENTS

| 2019/0146313 A1* | 5/2019 | De La Cruz ......... G03B 21/142 |
| | | 345/581 |
| 2022/0252868 A1* | 8/2022 | Sarkar ................ G02B 26/0875 |

FOREIGN PATENT DOCUMENTS

| CN | 110727038 | 1/2020 |
| CN | 110824819 | 2/2020 |
| CN | 112534306 | 3/2021 |

OTHER PUBLICATIONS

"International Search Report (Form PCT/ISA/210) of PCT/CN2022/131627", mailed on Dec. 15, 2022, with English translation thereof, pp. 1-4.

* cited by examiner

*Primary Examiner* — Howard D Brown, Jr.
(74) *Attorney, Agent, or Firm* — JCIPRNET

(57) ABSTRACT

A point cloud projection system provided by the present disclosure includes: a laser source array and a metalens array. The laser source array and the metalens array are set on the same optical axis. The laser source array is located at the focal plane in the object space of the metalens array. The metalens array have a positive focal length in a working waveband of the laser source array.

20 Claims, 5 Drawing Sheets

— 203

— 202

— 203

— 201

POINT CLOUD PROJECTION SYSTEM

CROSS-REFERENCE TO RELATED APPLICATION

This application is a continuation of International Patent Application of PCT application serial No. PCT/CN2022/131627, filed on Nov. 14, 2022, which claims the benefit of priority from China Application No. 202111397780.4, filed on Nov. 23, 2021. The entirety of each of the above mentioned patent applications is hereby incorporated by reference herein and made a part of this specification.

TECHNICAL FIELD

The present disclosure relates to the field of optical metalens, in particular to a point cloud projection system.

BACKGROUND

Point cloud is often used to obtain information about the detected and ranged objects. Point cloud is a data set of points in space. Points in the point cloud contain rich information, including 3D coordinates (X, Y, Z), color, classification value, intensity value, time, etc. Point cloud can represent 3D shapes or objects. For example, laser scanning obtains information about a scanned object through a laser point cloud.

In the relevant technology, a conventional lens group is used to collimate the light emitted by the laser, and the light passes through the DOE (Diffraction Optical Element), so as to form the point cloud. The arrangement pattern and other parameters of the point cloud arrays are mainly determined by the DOE. The conventional lens group collimates the divergent light emitted by the laser into parallel light.

During the implementation of this disclosure, the inventor found the following technical problems in the relevant technology:

In the relevant technology, the point cloud projection system contains multiple conventional optical lenses, which has a lot of disadvantages suchlike a large number of lenses, complex structure, large size in the optical axis direction and high cost resulted from the aspheric lenses.

SUMMARY

In view of the above technical problems, a point cloud system is provided according to embodiments of the present disclosure, so as to overcome the problems that the point cloud projection system has complex structure, large size and high cost caused by the limitation of traditional lens in the related art.

Firstly, a point cloud projection system, wherein the system includes: a laser source array and a metalens array; where the laser source array and the metalens array are set on the same optical axis;

the laser source array is located at the focal plane in the object space of the metalens array;

the metalens array have a positive focal length in a working waveband of the laser source array.

Optionally, the laser source array includes at least two point light sources.

Optionally, the laser source array includes a line light source array or a surface light source array.

Optionally, the metalens array includes at least one metalens.

Optionally, any one of the metalens of the metalens array comprises a substrate and a unit cell;

where the unit cell is arranged in an array with a densely packed pattern on the surface of the substrate;

a nano-structure is arranged at a vertex and/or center position of the densely packed pattern.

Optionally, the side length of adjacent metalens in the metalens array at least satisfies a relationship of:

$$D_{n-2} + D_{n-1} = 4h$$

where, h is half the length of the laser source array; n is the number of metalens in the metalens array, and n≥2; D is the side length of the metalens.

Optionally, the metalens array includes: a first metalens, a second metalens and a third metalens;

the first metalens, the second metalens, and the third metalens are arranged in an array.

the first metalens, the second metalens and the third metalens at least satisfy the relationship of:

$$D_0 + D_1 = 4h$$
$$D_1 + D_2 = 4h$$

where, h is half the length of the laser source array; D0、D1、D2 are the side lengths of the first metalens, the second metalens, and the third metalens, respectively.

Optionally, the maximum aspect ratio of the nano-structure is less than or equal to 20.

Optionally, the number of the metalens of the metalens array is an odd number.

Optionally, an outgoing surface of the laser source array and a plane of the point cloud projection system satisfy at least the relationship of:

$$\frac{1}{u} + \frac{1}{v} = \frac{1}{f}$$

where, u is the object distance of the metalens array, v is the image distance of the metalens array, f is the focal length of the metalens array.

Optionally, the phase of any metalens in the metalens array satisfies at least one of the following formulas:

$$\varphi(r) = \frac{2\pi}{\lambda} \sum_{i=1}^{N} a_i r^{2i} + \varphi_0;$$

$$\varphi(x, y) = \frac{2\pi}{\lambda} \sum_{i=1}^{N} a_i (x^2 + y^2)^i + \varphi_0;$$

$$\varphi(r) = \frac{2\pi}{\lambda} \sum_{i=1}^{N} a_i |r^i| + \varphi_0;$$

$$\varphi(x, y) = \frac{2\pi}{\lambda} \sum_{i=1}^{N} a_i (x^2 + y^2)^{i/2} + \varphi_0;$$

$$\varphi(r) = \frac{2\pi}{\lambda} \left( f - \sqrt{r^2 + f^2} \right) + \varphi_0;$$

where, $a_i$ is the phase coefficient, $\lambda$ is the wavelength, r is the distance from the center of the nano-structure in the metalens to the center of the metalens, x, y are coordinates on the metalens, and f is the focal length of the metalens.

Optionally, the point cloud projection system further includes: an aberration correction device;

the aberration correction device is set between the laser source array and the metalens array;

the aberration correction device is used to correct the aberration of the metalens array.

Optionally, the aberration correction device includes a metalens.

Optionally, the aberration correction device is a monolayer nano-structure which can be integrated on the metalens array.

Optionally, any one of the metalens in the metalens array also includes an anti-reflection film;

the anti-reflection film is located on the opposite side of the substrate from the nano-structure.

Optionally, the laser sources of the laser source array and the metalens in the metalens array correspond one to one.

Optionally, adjacent outgoing lights of the adjacent metalens in the metalens array are parallel to each other.

Optionally, the working waveband of the laser source array includes an infrared band.

Secondly, the embodiment of the present disclosure also provides laser device, wherein the laser device includes the point cloud projection system.

The technical scheme provided by the embodiment of the present disclosure at least achieves the following beneficial effects:

The point cloud projection system provided by the embodiment of the present disclosure arranges the laser source array and the metalens array on the same optical axis, and the metalens array has a positive focal length in a working waveband of the laser source array. The arrangement reduces the number of lenses in the point cloud projection system, simplifies the structure of the system, reduces the size of the point cloud projection system and the cost increase resulted from the use of high-cost aspherical lenses.

BRIEF DESCRIPTION OF THE DRAWINGS

In order to explain more clearly, the technical scheme in the disclosure technology or the background technology, the attached drawings required in the disclosure embodiment or the background technology will be explained below.

DETAILED DESCRIPTION OF DISCLOSURED EMBODIMENTS

In order to make the purpose, technical scheme and advantages of the present disclosure clearer, the embodiment of the present disclosure will be further described in detail below in combination with the attached drawings. It should be noted that, unless otherwise clearly specified and defined, the terms "installed", "connected" and "connected" connection should be generally understood, such as fixed connection or disassembly, mechanical or electrical connection, directly or indirectly through intermediate medium, or within the two components. The person of ordinary skill in the art may understand the above terms in the embodiment of this disclosure.

In addition, terms "first" and "second" are used for descriptive purposes, and are not intended to indicate or imply relative importance or implicitly indicate the quantity of the indicated technical features. Therefore, features defined by "first" or "second" may explicitly or implicitly include one or more of these features. In the description of the present disclosure, "plurality" or "multiple" means that there are two or more of these features, unless otherwise explicitly and specifically defined.

The point cloud projection system contains a conventional lens group, which has the disadvantages as: a large number of lenses, complex structure, large size, and high cost resulted from the use of high-cost aspherical lenses. Moreover, a point cloud projection system contained the conventional lens group has no needs to form the point cloud through DOE. The diffraction of other orders exists after the point cloud being formed through DOE, which produces stray interference, leading to the decrease of the utilization rate of light energy of the point cloud projection system, the decrease of the signal-to-noise ratio of point clouds, and the decrease of the propagation distance of point clouds. The embodiment of the present disclosure provides a point cloud projection system to overcome the above disadvantages.

The embodiment of this disclosure is described below in combination with the accompanying drawings in the embodiment of the present disclosure.

Figure 1:
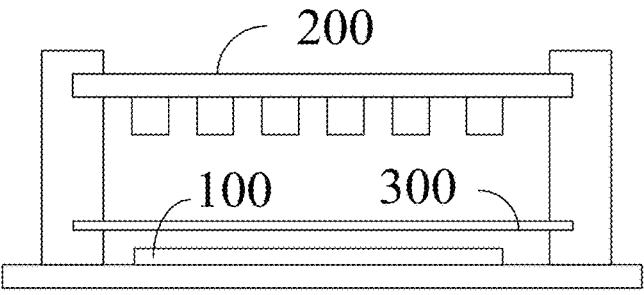
FIG. 1 illustrates an optional structural schematic diagram of the point cloud projection system provided by the embodiment of the present disclosure.

The point cloud system provided by the present disclosure as shown in FIG. 1, the point cloud system includes: a laser source array 100 and a metalens array 200. The laser source array 100 and the metalens array 200 are set on the same optical axis; the laser source array 100 is located at the focal plane in the object space of the metalens array 200; the metalens array 200 have a positive focal length in a working waveband of the laser source array 100.

It should be noted that the metalens array 200 in the embodiment of this disclosure includes a 1×1 array, a 1×N array, and a M×N array. That is, the 1×1 array 200 includes at least one metalens. Preferably, the metalens array 200 includes at least two metalenses. Metalens is an optical element with nanostructures on the surface, and the nano-structures have sub-wavelength dimensions. Optionally, any metalens in the metalens array 200 includes cascading nano-structures 203.

Figure 6:
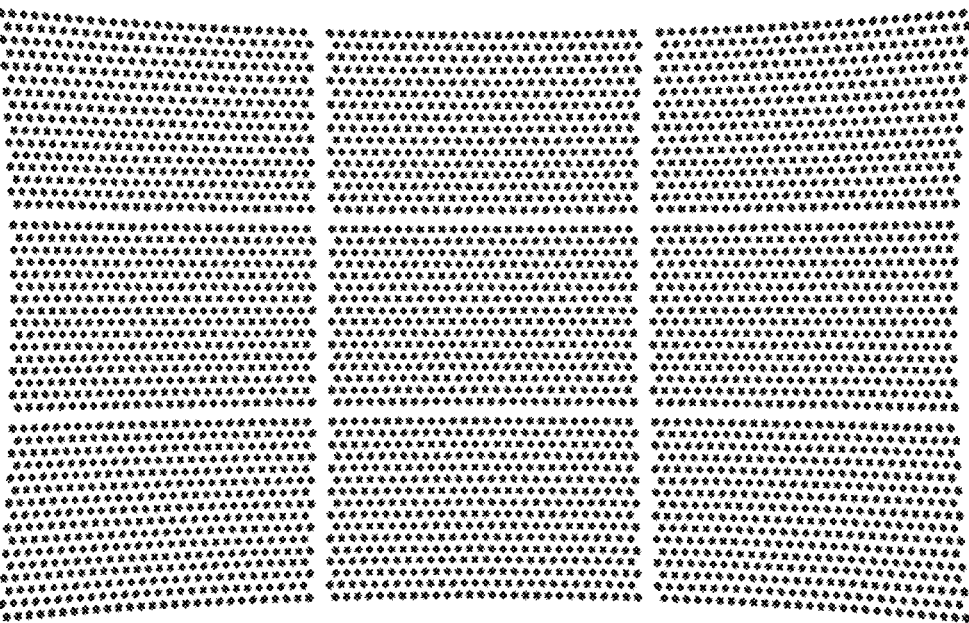
FIG. 6 illustrates a schematic diagram of an optional point cloud array of the point cloud projection system provided by the embodiment of the present disclosure.

In one embodiment as shown in FIG. 1, the light is emitted from the outgoing surface of the laser source array 100, and is modulated by the metalens array 200 to form a point cloud array in the far field. The point cloud array generated by the point cloud projection system is shown as FIG. 6, the point cloud array includes a plurality of point clouds arranged in arrays. The two adjacent point cloud units in the point cloud array shown in FIG. 6 are independent of each other.

Figure 2:
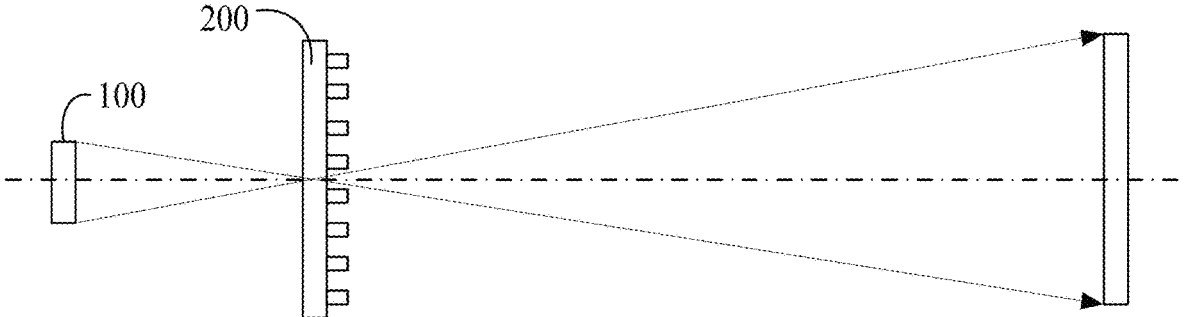
FIG. 2 illustrate a diagram of a point cloud projection system provided by the embodiment of the present disclosure.

FIG. 2 shows the relationship of the object and the image of the point cloud projection system. Since the outgoing surface of the laser source array 100 is located in the object-side of the metalens array 200, the outgoing surface of the laser source array 100 and the plane of the point cloud array satisfy at least the relationship of:

$$\frac{1}{u} + \frac{1}{v} = \frac{1}{f} \qquad (1)$$

wherein, u is the object distance of the metalens array, v is the image distance of the metalens array, f is the focal length of the metalens array. In order to reduce the size of the point cloud projection system provided by the embodiment of this disclosure, the focal length of the metalens array 200 may be comparatively small. Preferably, the focal length of the metalens array 200 satisfies: 1 mm≤f≤3 mm. In general, the distance between the point cloud array and the metalens array 200 (i. e., the image distance) is greater than 10 cm. Thus, u≈f can be obtained by inputting image distance of the metalens array into the formula (1), and u≈f means the out going surface of the laser source array is located at the focal plane in the object space of the metalens array 200.

In one embodiment, the laser source array 100 includes VCSEL (Vertical-Cavity Surface-Emitting Laser) or EEL (Edge Emitting Laser). Optionally, the working waveband of the laser source array 100 includes a visible band, an infrared band and an ultraviolet band. Preferably, the working waveband of the laser source array 100 is an near-infrared band.

In one optional embodiment, the laser source array 100 includes at least one laser source unit, the one laser source unit include at least two point light sources. In one embodiment, the laser source array 100 may be a line light source array, or may be a surface light source array, which means, the laser source array 100 may be a 1×N array, or may be a M×N array. Preferably, the number of the metalens of the metalens array 100 is odd. For example, the metalens array 100 is a 3×3 or 5×5 array.

It should be understood that any metalens of the metalens array includes a substrate 201 and a unit cell 202, the unit cell 202 is arranged in an array with a densely packed pattern on the surface of the substrate 201; and a nano-structure 203 is arranged at a vertex and/or center position of the densely packed pattern.

Generally, the substrate 201 is made of molten quartz, plexiglass or other transparent materials. It should be noted that transparency in the embodiment of this disclosure means that the extinction coefficient of the light is less than 0.1 in the working waveband of the laser source array 100. Preferably, the extinction coefficient of the light is less than 0.01 in the working waveband of the substrate 201.

Figure 7:
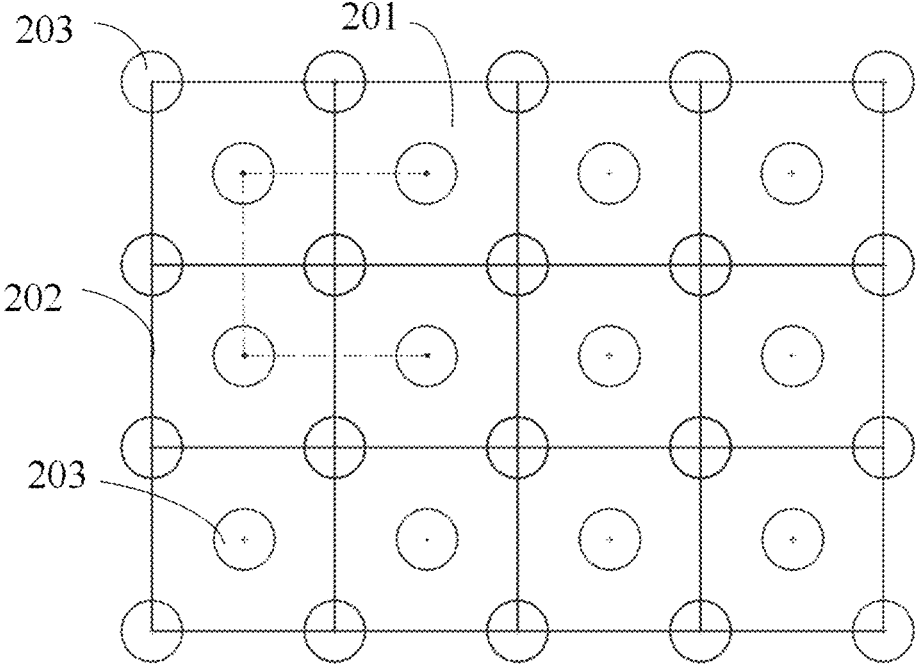
FIG. 7 illustrates an optional structural schematic view of the unit cell provided by the embodiment of the present disclosure.
Figure 8:
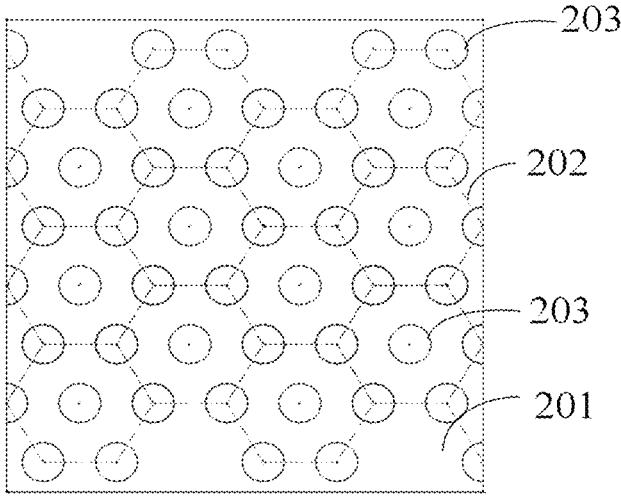
FIG. 8 illustrates another optional structural schematic view of the unit cell provided by the embodiment of the present disclosure.

In one optional embodiment, the unit cell 202 is located on at least one side of the substrate 201. As shown in FIG. 7 and FIG. 8, the shape of the unit cell 202 includes a regular hexagon and a square. The shape of the unit cell 202 further includes a fan shape and other densely packed pattern. Further, the shape of the unit cell 202 in any one of the metalens may be all the same, partially identical or mutually identical. Furthermore, the periodic of the unit cells 202 may be all the same, partially identical or mutually identical. Preferably, the periodic of the unit cells 202 is greater than 300 nm and less than 1500 nm. The shape and periodic of the unit cells 202 can be adjusted according to the phase of the metalens.

Furthermore, the dimensional characteristics of the nano-structure 203 may also be adjusted according to the phase of the metalens. The nano-structure 203 is a sub-wavelength structure, that is, the nano-structure 203 is less than or equal to the working wavelength of the metalens. Optionally, the dimensional characteristics of the nano-structure 203 may be slightly larger than the working wavelength of the metalens. The dimensional characteristics of the nano-structures 203 may include: height, cross-section diameter, cross-section periodicity, distance between adjacent nano-structures 203, and so on.

In one embodiment, the maximum aspect ratio of the nano-structure 203 is less than or equal to 20, and the maximum aspect ratio of the nano-structure 203 is the ratio of the height of the nano-structure 203 to the smallest diameter of the nano-structure 203. In this way, the mechanical performance of the nano-structures 203 can be ensured while ensuring the optical performance of the nano-structures 203. The nano-structures 203 have the same cross-sectional diameter, or partially identical, or different at different positions. The optical phase of the nano-structure 203 is correlated with the cross-sectional diameter of the nano-structure 203. It should be understood that the geometry and size of the nano-structures 203 can be adjusted to meet the other detecting requirements and processing conditions. For example, the shape of the nano-structures 203 includes at least one or more combinations of the structures such as cylindrical nanopillars, cuboid nanopillars, fins nanopillars, nano-ring columns and hollow nanopillars.

Figure 4:
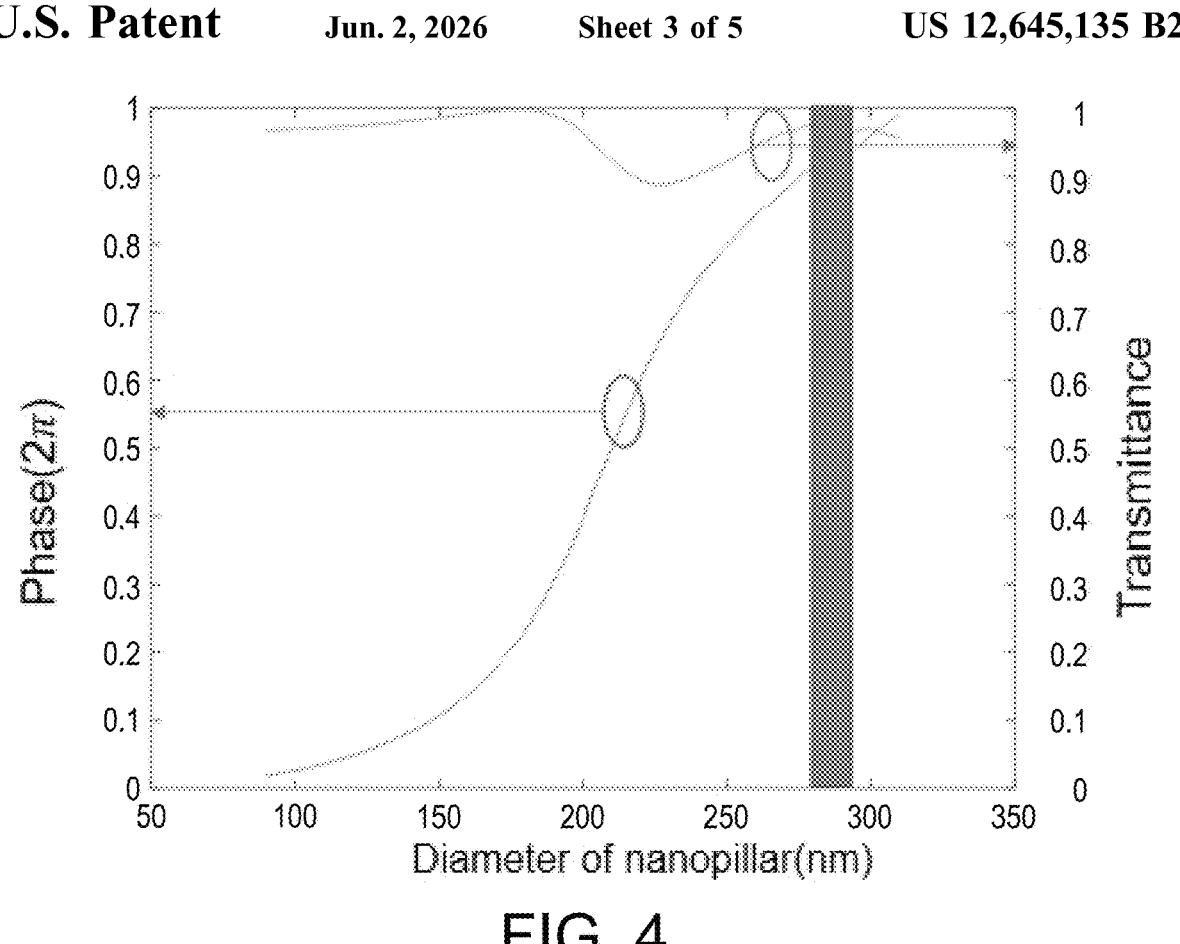
FIG. 4 illustrates the relationship between the diameter of the nano-structure and the phase and transmittance of the point cloud projection system at the working wavelength of 940 nm provided by the embodiment of the present disclosure.

In one optional embodiment, any of the metalens array 200 also includes a filler material filled between the nano-structures 203. According to the phase of the metalens, the shape, size, and filler material of the nano-structure 203 can be selected. Optionally, the relationship between the diameter of the nano-structure 203 in the point cloud projection system and the phase and transmittance of the metalens is shown in FIG. 4.

To increase the uniformity of the point cloud units generated by the point cloud projection system, as well as the uniformity of points within each point cloud unit, the phase of metalens in any one of the metalens array 200 satisfies at least one of the following formulas:

$$\varphi(r) = \frac{2\pi}{\lambda} \sum_{i=1}^{N} a_i r^{2i} + \varphi_0;$$

$$\varphi(x, y) = \frac{2\pi}{\lambda} \sum_{i=1}^{N} a_i \left(x^2 + y^2\right)^{i} + \varphi_0;$$

$$\varphi(r) = \frac{2\pi}{\lambda} \sum_{i=1}^{N} a_i \left|r^i\right| + \varphi_0;$$

$$\varphi(x, y) = \frac{2\pi}{\lambda} \sum_{i=1}^{N} a_i \left(x^2 + y^2\right)^{i/2} + \varphi_0;$$

$$\varphi(r) = \frac{2\pi}{\lambda} \left(f - \sqrt{r^2 + f^2}\right) + \varphi_0;$$

where $a_i$ is the phase coefficient, $\lambda$ is the wavelength, r is the distance from the center of the nano-structure in the metalens to the center of the metalens, x, y are coordinates on the metalens, and f is the focal length of the metalens.

Figure 3:
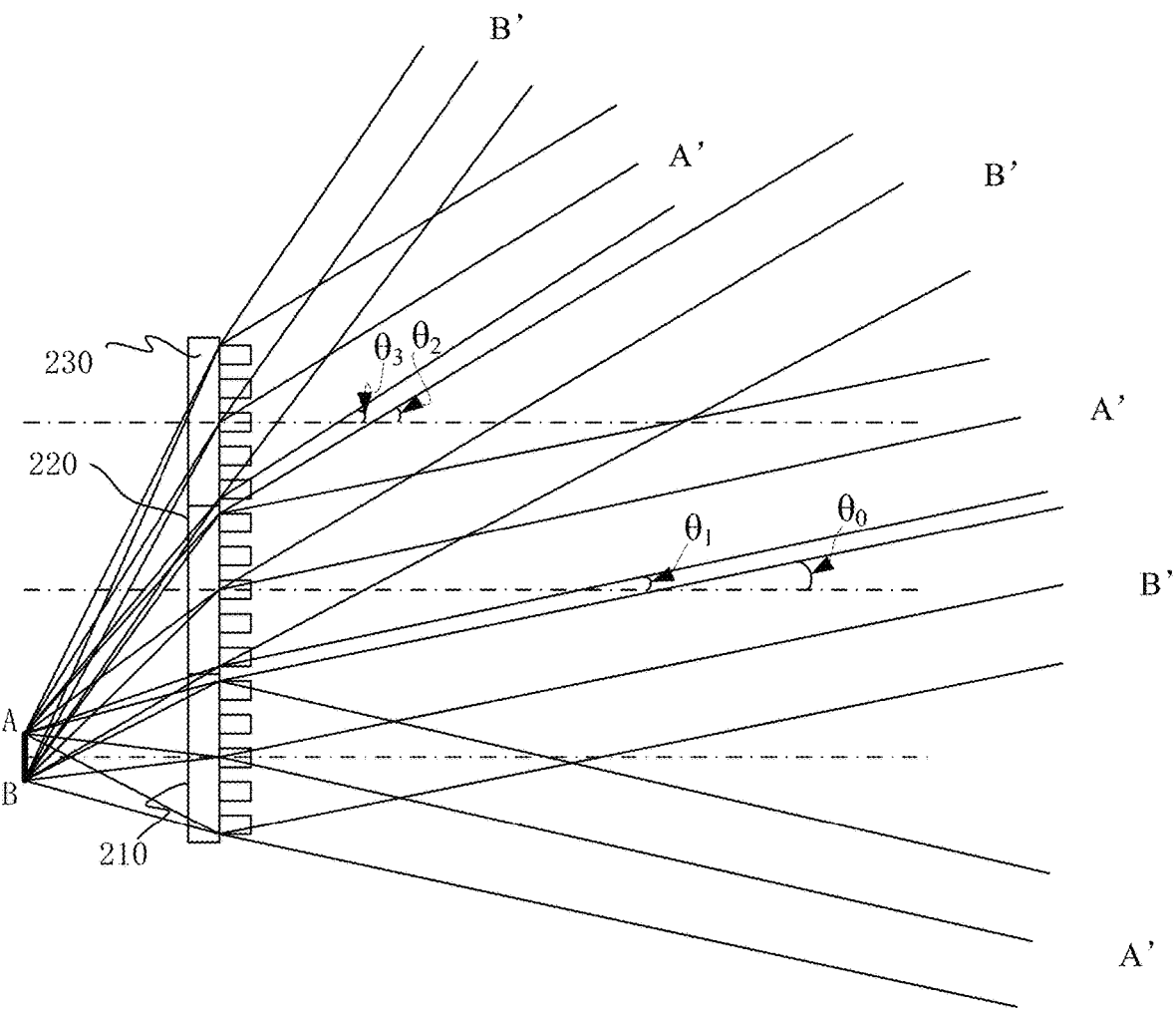
FIG. 3 illustrates a projection diagram of the point cloud projection system provided by the embodiment of the present disclosure.

In the embodiment of the present disclosure, considering the symmetry of the metalens array 200, the number of the metalens of the metalens array 200 is an odd number. FIG. 3 shows a schematic projection diagram of the point cloud projection system provided by the embodiment of the present disclosure. As shown in FIG. 3, A and B represent two point light sources, and A 'and B' are the corresponding images of A and B, respectively. Optionally, as shown in FIG. 3, the metalens array 200 includes at least two metalenses.

Further, to ensure the adjacent point cloud units will not overlap or diverge with the projected distance changes, adjacent outgoing lights of the adjacent metalens in the metalens array are parallel to each other. "the adjacent point cloud units will not overlap or diverge" means that in the image space of the metalens array 200, the point cloud array at different distances from the metalens array 200 are similar figures, and the point cloud units at different distances are also similar figures. Moreover, when the distance between the point cloud array and the metalens array 200 changes, the adjacent point cloud units in the point cloud array will not overlap and the angle of the boundary of the adjacent point cloud units remains unchanged. For example, as shown in FIG. 3, $\theta_0 = \theta_1$ and $\theta_2 = \theta_3$. Optionally, the side length of adjacent metalens in the metalens array at least satisfies a relationship of:

$$D_{n-2} + D_{n-1} = 4h$$

h is half the length of the laser source array; n is the number of metalens in the metalens array, and n≥2; D is the side length of the metalens.

For example, the metalens array 200 includes: a first metalens 210, a second metalens 220 and a third metalens 230.

The second metalens and the third metalens at least satisfy the relationship of:

$$D_0 + D_1 = 4h$$

$$D_1 + D_2 = 4h$$

Where h is half the length of the laser source array; and the D0、D1、D2 are the side lengths of the first metalens, the second metalens, and the third metalens, respectively.

Optionally, any metalens in the metalens array 200 may also include an anti-reflection film. The anti-reflection film is located on the opposite side of the substrate 201 from the nano-structure 203. The anti-reflection film is used to increase the transmittance of the light emitted by the laser source array 100.

In an optional embodiment, the point cloud projection system provided by the present disclosure further includes: an aberration correction device 300. The aberration correction device is set between the laser source array 100 and the metalens array 200, and the aberration correction device is used to correct the aberration of the metalens array. After the light emitting from the outgoing surface of the laser source array 100, the light is pre-corrected for aberrations by aberration correction device 300, and then directed towards the metasurface array 200. Finally, the light is projected in the far field to form a point cloud through the metasurface array 200. Optionally, the aberration correction device 300 is a conventional phase correction plate. Preferably, the aberration correction device 300 is a metalens. More favorable, when the aberration correction device 300 is a metalens, the aberration correction device 300 may be a mono-layer nano-structure which can be integrated on the metalens array 200.

Embodiment I

Figure 5:
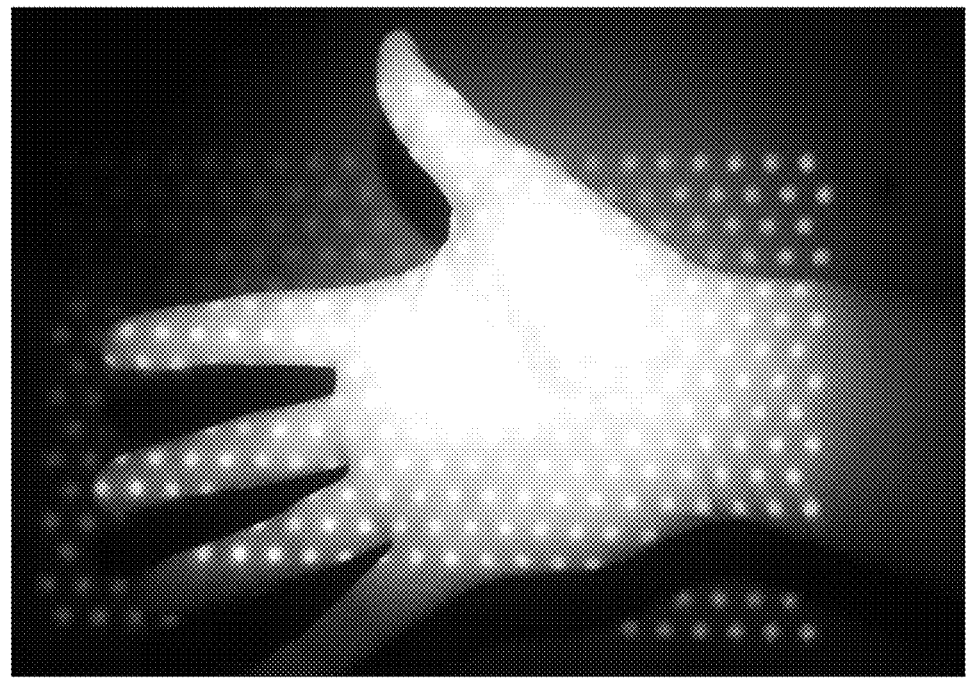
FIG. 5 illustrates a real scene test diagram of the point cloud projection system provided by the embodiment of the present disclosure.

In the embodiment I, the working waveband of the point cloud projection system provided by the he embodiment of the present disclosure is 940 nm. The laser source array 100 is a 28×20 VCSEL array, and the size of the laser source array 100 is 506 μm×870 μm. The metalens array 200 is a 3×3 metalens array. The relationship between the diameter and phase and transmittance of the nanostructure 203 in the metalens array 200 is shown in FIG. 5, and the phase of the metalens array 200 satisfies formula (2). The metalens array 200 has a focal length of 3 mm. The fields of view of the metalens array 200 in the H, V, and D directions are 9.6°, 16.5°, 19.1°, respectively. The H and V directions are the directions perpendicular to the optical axis of the metalens array 200 on the point cloud array, and the rectangle is established with the H direction and V direction assumed as the edges, and the D direction is the diagonal direction of the rectangle.

A real scene test diagram of the point cloud projection provided in embodiment I is shown in FIG. 5, and a palm in FIG. 5 is a scanning object used as a reference. The thickness of the palm helps to observe the different distance between the point cloud array projected to the palm and the point cloud array projected to the far field, so as to distinguish the point cloud arrays at different distances. The point cloud array on the palm is close to the metalens array 200, and the point cloud array in the background of the far field is far away from the metalens array 200. As can be seen from FIG. 5, the point cloud array projected by the metalens arrays 200 will be similar in shape and evenly distributed at different distances. The angle between boundaries of adjacent point cloud units shown in FIG. 5 will not change with the point cloud projection distance changes. For example, as shown in FIG. 5, the points with the same trends forms the point cloud units, and the angle of the boundary of the adjacent point cloud unit will not change when the distance between the point cloud array and the metalens array 200 changes.

Embodiment II

In the embodiment II, the working waveband of the point cloud projection system provided by the he embodiment of the present disclosure is 940 nm. The laser source array 100 is a 28×20 VCSEL array, and the size of the laser source array 100 is 506 μm×870 μm. The metalens array 200 is a 3×3 metalens array. The relationship between the diameter and phase and transmittance of the nanostructure 203 in the metalens array 200 is shown in FIG. 5, and the phase of the metalens array 200 satisfies formula (6). The metalens array 200 has a focal length of 6 mm. The fields of view of the metalens array 200 in the H, V, and D directions are 28.4°, 47.0°, 53.1°, respectively. The H and V directions are the direction of the point cloud array perpendicular to the optical axis of the metalens array 200, respectively. Assuming the H and V directions as edges, a rectangle is established. And the D direction is the diagonal direction of the rectangle. The point cloud array of the point cloud projection provided in Embodiment II is shown in FIG. 7. As shown in FIG. 7, the point cloud array and the metalens array 200 correspond one-to one, that is, the metalens in the metalens array 200 and point cloud unit of the point cloud array correspond one to one.

In conclusion, the point cloud projection system provided by the embodiment of the present disclosure arranges the laser source array and the metalens array on the same optical axis, and the metalens array has a positive focal length in a working waveband of the laser source array. The arrangement reduces the number of lenses in the point cloud projection system, simplifies the structure of the system, reduces the size of the point cloud projection system, and reduces the cost increase resulted from the use of high-cost aspherical lenses. In additional, the point cloud projection system provided in the embodiment of the present disclosure has no need to DOE, thus avoids the high-order diffraction and the stray interference resulted from DOE, so as to improve the light energy utilization factor and the signal-noise-ratio of the point cloud generated by the point cloud projection system. The point cloud projection system improves the signal-noise-ratio of point clouds, and then increases the propagation distance of point cloud at far field, which is more suitable for long distance projection than the conventional point cloud projection system.

The above is only a specific embodiment of the embodiment of this disclosure, but the scope of protection of the embodiment of this disclosure is not limited to this, any person familiar with the scope of the change or substitution, should be covered within the protection scope of the embodiment of this disclosure. Therefore, the scope of the protection of the present disclosure shall depend to the scope of the claim.

What is claimed is:

1. A point cloud projection system, wherein the system comprises: a laser source array and a metalens array;

wherein, the laser source array and the metalens array are set on the same optical axis;

the laser source array is located at the focal plane in the object space of the metalens array;

the metalens array have a positive focal length in a working waveband of the laser source array.

2. The point cloud projection system according to claim 1, wherein the laser source array comprises at least two point light sources.

3. The point cloud projection system according to claim 2, wherein the laser source array comprises a line light source array or a surface light source array.

4. The point cloud projection system according to claim 1, wherein the metalens array comprises at least one metalens.

5. The point cloud projection system according to claim 4, wherein any one of the metalens of the metalens array comprises a substrate and a unit cell;

wherein, the unit cell is arranged in an array with a densely packed pattern on the surface of the substrate;

a nano-structure is arranged at a vertex and/or center position of the densely packed pattern.

6. The point cloud projection system according to claim 5, wherein the side length of adjacent metalens in the metalens array at least satisfies a relationship of:

$$D_{n-2} + D_{n-1} = 4h$$

wherein, h is half the length of the laser source array; n is the number of metalens in the metalens array, and n≥2; D is the side length of the metalens.

7. The point cloud projection system according to claim 6, wherein the metalens array comprises: a first metalens, a second metalens and a third metalens;

the first metalens, the second metalens, and the third metalens are arranged in an array.

8. The point cloud projection system according to claim 7, wherein the first metalens, the second metalens and the third metalens at least satisfy the relationship of:

$$D_0 + D_1 = 4h$$

$$D_1 + D_2 = 4h$$

wherein, h is half the length of the laser source array; D0、D1、D2 are the side lengths of the first metalens, the second metalens, and the third metalens, respectively.

9. The point cloud projection system according to claim 5, wherein the maximum aspect ratio of the nano-structure is less than or equal to 20.

10. The point cloud projection system according to claim 1, wherein the number of the metalens of the metalens array is an odd number.

11. The point cloud projection system according to claim 1, wherein an outgoing surface of the laser source array and a plane of the point cloud projection system satisfy at least the relationship of:

$$\frac{1}{u} + \frac{1}{v} = \frac{1}{f}$$

wherein, u is the object distance of the metalens array, v is the image distance of the metalens array, f is the focal length of the metalens array.

12. The point cloud projection system according to claim 1, wherein the phase of any metalens in the metalens array satisfies at least one of the following formulas:

$$\varphi(r) = \frac{2\pi}{\lambda} \sum_{i=1}^{N} a_i r^{2i} + \varphi_0;$$

$$\varphi(x, y) = \frac{2\pi}{\lambda} \sum_{i=1}^{N} a_i (x^2 + y^2)^i + \varphi_0;$$

$$\varphi(r) = \frac{2\pi}{\lambda} \sum_{i=1}^{N} a_i |r^i| + \varphi_0;$$

$$\varphi(x, y) = \frac{2\pi}{\lambda} \sum_{i=1}^{N} a_i (x^2 + y^2)^{i/2} + \varphi_0;$$

$$\varphi(r) = \frac{2\pi}{\lambda} \left( f - \sqrt{r^2 + f^2} \right) + \varphi_0;$$

wherein, $a_i$ is the phase coefficient, $\lambda$ is the wavelength, r is the distance from the center of the nano-structure in the metalens to the center of the metalens, x, y are coordinates on the metalens, and f is the focal length of the metalens.

13. The point cloud projection system according to claim 1, wherein the point cloud projection system further comprises: an aberration correction device;

the aberration correction device is set up between the laser source array and the metalens array;

the aberration correction device is used to correct the aberration of the metalens array.

14. The point cloud projection system of claim 11, wherein the aberration correction device comprises a metalens.

15. The point cloud projection system according to claim 14, wherein the aberration correction device is a monolayer nano-structure which can be integrated on the metalens array.

16. The point cloud projection system according to claim 1, wherein any one of the metalens in the metalens array also comprises an anti-reflection film;

the anti-reflection film is located on the opposite side of the substrate from the nano-structure.

17. The point cloud projection system according to claim 1, wherein the laser sources of the laser source array and the metalens in the metalens array correspond one to one.

18. The point cloud projection system according to claim 1, wherein adjacent outgoing lights of the adjacent metalens in the metalens array are parallel to each other.

19. The point cloud projection system according to claim 15, wherein the working waveband of the laser source array comprises an infrared band.

20. A laser device, wherein the laser device comprises the point cloud projection system of claim 1.

\* \* \* \* \*